US010149467B2

(12) United States Patent
Hann

(10) Patent No.: US 10,149,467 B2
(45) Date of Patent: Dec. 11, 2018

(54) FISHHOOK REMOVER AID

(71) Applicant: Kelly J. Hann, Camden, OH (US)

(72) Inventor: Kelly J. Hann, Camden, OH (US)

(*) Notice: Subject to any disclaimer, the term of this patent is extended or adjusted under 35 U.S.C. 154(b) by 49 days.

(21) Appl. No.: 15/164,132

(22) Filed: May 25, 2016

(65) Prior Publication Data

US 2016/0345567 A1   Dec. 1, 2016

Related U.S. Application Data

(60) Provisional application No. 62/167,173, filed on May 27, 2015.

(51) Int. Cl.
*A01K 97/18* (2006.01)
*A01K 97/00* (2006.01)

(52) U.S. Cl.
CPC .............. *A01K 97/18* (2013.01); *A01K 97/00* (2013.01)

(58) Field of Classification Search
CPC ................................. A01K 97/18; A01K 97/00
USPC ....... 43/53.5, 4; D22/134, 149; 33/511, 549, 33/485
See application file for complete search history.

(56) References Cited

U.S. PATENT DOCUMENTS

| | | | | | |
|---|---|---|---|---|---|
| 1,243,622 | A | * | 10/1917 | Nielsen | A01K 87/00 172/370 |
| 1,438,091 | A | * | 12/1922 | Bowe | A22C 25/06 452/195 |
| RE21,375 | E | * | 2/1940 | Tillinghast | A01K 97/18 43/53.5 |
| 2,263,965 | A | * | 11/1941 | Fiori | A01K 97/14 294/99.2 |
| 2,358,682 | A | * | 9/1944 | Benton | A22C 25/06 24/507 |
| 2,547,592 | A | * | 4/1951 | Morris | A01K 97/18 43/53.5 |

(Continued)

FOREIGN PATENT DOCUMENTS

| | | | | |
|---|---|---|---|---|
| DE | 3710671 A1 | * | 10/1987 | ............. A01K 97/04 |
| DE | 29607502 U1 | * | 9/1996 | ............. A01K 97/18 |

(Continued)

OTHER PUBLICATIONS

Fish Hook Removers, Price Comparison and reviews at best-deal.com, http://www.best-deal.com/search; last visited May 24, 2016.

*Primary Examiner* — Darren W Ark
(74) *Attorney, Agent, or Firm* — Mary Sweeney, Esq.

(57) ABSTRACT

One embodiment of the invention is a fishhook remover aid 100 that has a base 102 and a cover 170. The base 102 is longer than the cover 170. When reeling in a fish, an angler may first insert a fishing line 138 through a space 120 located on top portions 112, 114 of the cover 170. The fish is then urged along the base 102 and into the cover 170. Opposing rounded sides 108, 110 of the cover 170 are flexible, allowing the angler to grasp the fishhook remover aid with sufficient pressure on the fish to remove the fishhook 138 without damaging the fish in the process. The safe swift removal of the fishhook without the need for an angler's hand to come into direct contact with the fish thus occurs. The fishhook remover aid 100 has a built in ruler 134 located on the base 102 for measuring a length of the fish while the angler removes the fishhook.

11 Claims, 3 Drawing Sheets

(56) References Cited

U.S. PATENT DOCUMENTS

| | | | | | |
|---|---|---|---|---|---|
| 2,616,745 | A | * | 11/1952 | Alston | A01K 97/18 15/227 |
| 2,643,151 | A | * | 6/1953 | Zupancic | A01K 97/00 24/498 |
| 2,757,951 | A | * | 8/1956 | Benton | A22C 25/06 294/99.2 |
| 2,800,356 | A | * | 7/1957 | Benton | A22C 25/06 294/106 |
| 2,881,022 | A | * | 4/1959 | Brust | A01K 97/14 294/106 |
| 2,892,284 | A | | 6/1959 | Shawan | |
| 2,918,747 | A | * | 12/1959 | Terlecky | A01K 97/18 43/53.5 |
| D188,383 | S | * | 7/1960 | Gravning | D22/149 |
| 2,980,915 | A | * | 4/1961 | Peterson | A41D 19/01547 2/159 |
| 3,081,576 | A | * | 3/1963 | Collins | A01K 83/06 224/920 |
| 3,181,198 | A | * | 5/1965 | Stelzen | A22C 25/025 294/25 |
| 3,236,553 | A | * | 2/1966 | Shrier | A01K 97/18 2/161.8 |
| 3,259,988 | A | * | 7/1966 | Lunn | A01K 97/00 33/501 |
| 3,389,491 | A | * | 6/1968 | Lowrey | A01K 97/14 43/5 |
| 3,556,507 | A | * | 1/1971 | Frederick Bailey Haskell | A01K 97/14 24/129 R |
| D220,395 | S | * | 4/1971 | Garelli et al. | D22/149 |
| 3,738,050 | A | * | 6/1973 | Naill | A01K 97/18 43/53.5 |
| 3,905,145 | A | * | 9/1975 | Cunningham | A01K 97/18 43/53.5 |
| 3,975,043 | A | * | 8/1976 | Miles | B65G 7/12 294/16 |
| D241,641 | S | * | 9/1976 | Brown | D22/149 |
| 4,196,538 | A | * | 4/1980 | Crone | A01K 97/00 206/315.11 |
| 4,682,803 | A | * | 7/1987 | Andrews | B25B 9/02 294/16 |
| 4,797,974 | A | * | 1/1989 | Smith, Jr. | A22C 25/06 294/25 |
| 4,821,378 | A | * | 4/1989 | Streit | A22C 25/06 294/25 |
| 5,097,617 | A | * | 3/1992 | Craven | A01K 97/00 33/485 |
| 5,148,607 | A | * | 9/1992 | Lasiter | A01K 97/00 206/315.11 |
| 5,339,532 | A | * | 8/1994 | O'Keefe | A01K 97/00 33/485 |
| 5,526,575 | A | * | 6/1996 | Hoover | A01K 97/00 33/485 |
| 6,389,731 | B1 | * | 5/2002 | Freeman | A01K 97/18 43/4 |
| 6,765,155 | B1 | * | 7/2004 | Gray | G01B 3/04 177/148 |
| 7,191,536 | B1 | * | 3/2007 | Bailey | A22C 25/04 33/485 |
| D539,681 | S | * | 4/2007 | Bailey | D10/70 |
| 7,426,801 | B2 | * | 9/2008 | Freburger, Jr. | A01K 97/05 43/4 |
| 7,661,222 | B1 | * | 2/2010 | Bowers | A01K 97/14 43/4 |
| 7,665,220 | B1 | * | 2/2010 | Gee | A01K 97/00 33/485 |
| 7,685,763 | B1 | * | 3/2010 | Myers | A01K 97/14 43/4 |
| 8,141,262 | B1 | * | 3/2012 | Lee | A01K 97/00 33/511 |
| 8,667,730 | B1 | | 3/2014 | Hughes | |
| 2005/0198886 | A1 | * | 9/2005 | Rojas | A01K 97/14 43/4 |
| 2006/0260172 | A1 | * | 11/2006 | Hufe, Jr. | A01K 77/00 43/5 |
| 2010/0281752 | A1 | * | 11/2010 | Daley, Jr. | A01K 77/00 43/11 |
| 2011/0192046 | A1 | * | 8/2011 | Kinziger | A01K 97/00 33/759 |
| 2012/0324751 | A1 | * | 12/2012 | Wakeman | A01K 97/00 33/759 |
| 2015/0059233 | A1 | * | 3/2015 | Hague | A01K 97/14 43/54.1 |
| 2017/0000099 | A1 | * | 1/2017 | Wanke | A01K 97/00 |

FOREIGN PATENT DOCUMENTS

| | | | | |
|---|---|---|---|---|
| FR | 586820 A | * | 4/1925 | A01K 97/18 |
| FR | 2476439 A1 | * | 8/1981 | A01K 97/18 |
| FR | 2599937 A3 | * | 12/1987 | A01K 97/18 |
| GB | 471243 A | * | 8/1937 | A01K 97/18 |
| GB | 1104278 A | * | 2/1968 | A01K 97/18 |
| JP | 10052200 A | * | 2/1998 | |
| JP | 2000178814 A | * | 6/2000 | A41D 19/0041 |
| JP | 3060030 B2 | * | 7/2000 | A41D 19/0041 |
| JP | 2012175913 A | * | 9/2012 | |
| JP | 2014113354 A | * | 6/2014 | |
| JP | 6030428 B2 | * | 11/2016 | |
| WO | WO-2015042659 A1 | * | 4/2015 | A01K 97/18 |

* cited by examiner

FISHHOOK REMOVER AID

CROSS-REFERENCE TO RELATED APPLICATIONS

This application claims the benefit of U.S. Provisional Application No. 62/167,173, filed May 27, 2015, having the title "Fishhook Remover" by Hann, which is incorporated by reference in its entirety.

BACKGROUND OF THE INVENTION

Field of the Invention

The present disclosure relates to a fishhook remover aid that holds a caught fish firmly in place allowing for the removal of the fishhook without the need for an angler's hand to come into direct contact with the fish. The fishhook remover aid features a built in ruler for measuring the length of the fish while the hook is being removed.

Description of the Related Art

Fishhook remover aids are important tools for anglers. Currently, a number of fishhook remover aids on the market are available to remove fishhooks from mouths of fish. These aids traditionally expose the angler's skin to slime, dirt and to the fish's sharp fins and scales or the aids are cumbersome to use. Regardless of the fishhook remover aid employed, a separate measuring device to measure the size of caught fish must be procured even after the fishhook has been removed.

Thus, an unaddressed need exists in the industry to address these deficiencies and inadequacies.

SUMMARY

According to aspects of the present invention, a device for grabbing hold of a fish without actually coming into contact with the fish with one's bare hands is presented. Once the fish is securely placed in the handheld fishhook remover aid, the quick, safe and easy removal of a fishhook from the mouth or body of the fish may be carried out. The length of the fish can also be determined at the same time the hook is removed because the fishhook remover aid has a built in ruler.

Other systems, devices, methods, features, and advantages will become apparent to one with skill in the art upon examination of the following drawings and detailed description. It is intended that all such additional systems, methods, features, and advantages included within this description be within the scope of the present invention, and be protected by the accompanying claims.

BRIEF DESCRIPTION OF THE SEVERAL VIEWS OF THE DRAWINGS

Many aspects of the disclosure can be better understood with reference to the following drawings. The components in the drawings are not necessarily to scale, emphasis instead being placed upon clearly illustrating the principles of the present disclosure. Also, like reference numerals designate corresponding parts throughout the several views.

DETAILED DESCRIPTION OF THE INVENTION

Figures 1A, 1B:
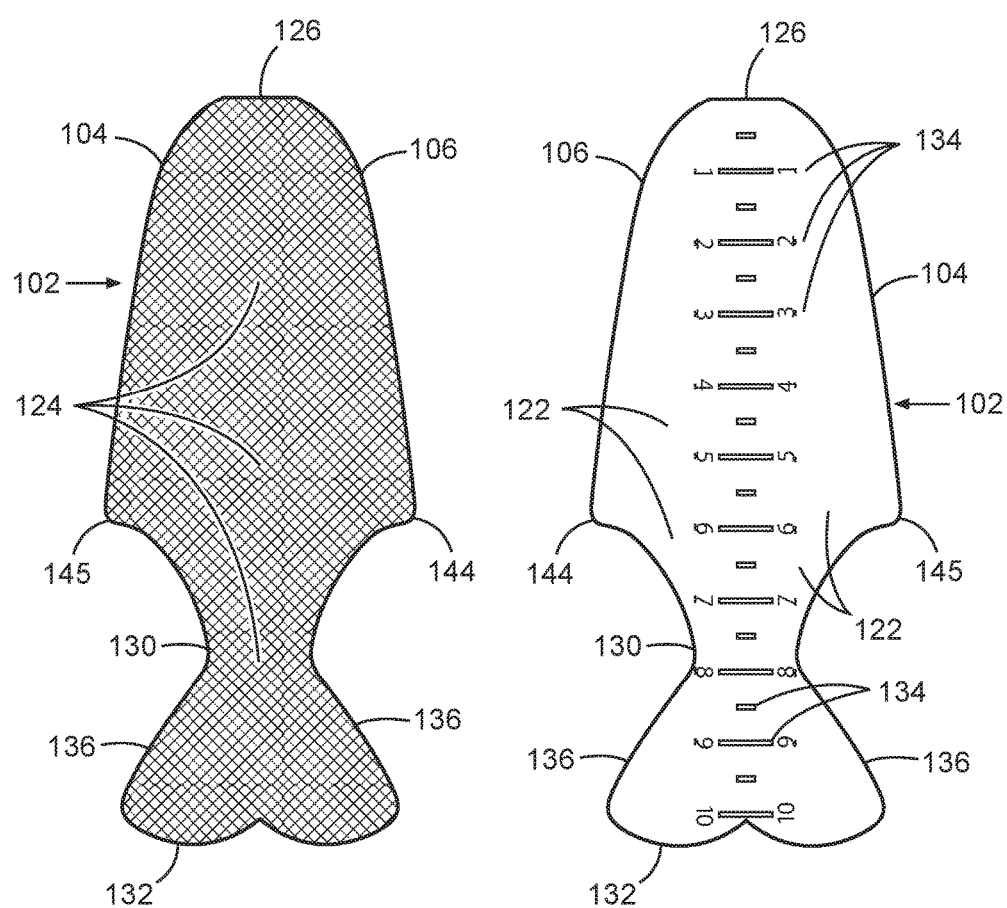
FIG. 1A is a bottom, perspective view of a base of a fishhook remover aid showing an outside surface.
FIG. 1B is a top, perspective view of the base of the fishhook remover aid showing an inside surface.

Reference is now made in detail to the description of the embodiments as illustrated in the drawings. While several embodiments are described in connection with these drawings, there is no intent to limit the disclosure to the embodiment or embodiments disclosed herein. On the contrary, the intent is to address all alternatives, modifications, and equivalents.

The fishhook remover aid is a one of a kind product that aids an angler in removing a fish from a hook without the need to touch the fish itself. Once the fish is caught, the fishhook remover aid protects a fisherman from the possibility of receiving cuts from scales or sharp fins and eliminates touching a wet or slimy fish. Thus, there is no need to wash slick slimy hands after handling each fish, which could be appealing to all anglers especially female anglers. Most importantly, the angler will not accidently lose the caught fish because it is now possible to grasp the fish firmly when removing the hook. With the fishhook remover aid, the caught fish is easily restrained within the device, thus eliminating the fish from flopping all around. Using the fishhook remover aid provides a safe and fast way to release the fish back into water or into a cooler after removing a hook. The fishhook remover aid device is especially appealing for those teaching children how to handle caught fish in a safe manner. The size of each fish is readily determined using the ruler on the base. When a fishing expedition is over for the day, the angler simply rinses the fishhook remover aid and lets it drain dry until ready for the next fishing adventure.

Currently, numerous fishhook remover aids exist. However, these aids suffer from various drawbacks. The disclosed fishhook remover aid provides an alternative approach that remedies various drawbacks existent in those previously proposed fishhook remover aids.

As defined herein, the term "fishhook remover aid" will be used interchangeably with the term "device."

As defined herein, the term "top of a base" or "top of the base" corresponds to the inside surface of the base.

As defined herein, the term "bottom of a base" or "bottom of the base" corresponds to the outside surface of the base.

As defined herein, the term "top of a cover" or "top of the cover" corresponds to the outside surface of the cover.

As defined herein, the term "bottom of a cover" or "bottom of the cover" corresponds to the inside surface of the cover.

As defined herein, the term "ruler" may be used interchangeably with the term "measuring tool" and is defined as an apparatus that is delineated in equidistant units, the apparatus being used to determine lengths, widths and heights of objects."

FIG. 1A shows a bottom view of a base 102. The bottom of the base 102 will be referenced herein as the outside surface 124 of the base 102. FIG. 1B shows a top view of the base 102. The top of the base 102 will be referenced herein as the inside surface 122 of the base 102. Thus, the outside surface 124 (bottom) of the base 102 and the inside surface 122 (top) of the base 102 are mirror images of each other.

Referring to FIG. 1A, the outside surface 124 of the base 102 has a right edge 106 and a left edge 104. The right edge 106 and left edge 104 oppose each other. The base 102 has a front end 126, a midsection 130 and a back end 132, 136. Referring again to FIG. 1A, the outside surface 124 of the base 102 originates at the front end 126. The front end 126 terminates at the widest regions 145, 144 on the base 102. Beginning at the widest regions 145, 144, the base 102 constricts to form a midsection 130. The back end 136 originates at the narrowest region of the midsection 130 and concludes at a terminal point 132 on the back end 126. In other embodiments, the midsection 130 and back end 132, 136 could be configured in combinations of widths, including but not limited to an absence of the constricted midsection 130 and the absence of a two-fan tail-like back end 132, 136 as shown in FIG. 1A.

Referring to FIG. 1B, the inside surface 122 of the base 102 has a right edge 104 and a left edge 106. The right edge 104 and left edge 106 oppose each other. The base 102 has a front end 126, a midsection 130 and a back end 132, 136. The inside surface 122 of the base 102 originates at the front end 126. The front end 126 terminates at the widest regions 144, 145 on the base 102. Beginning at the widest regions of the front end 144, 145, the base 102, constricts to form a midsection 130. The back end 136 originates at the narrowest point of the midsection 130 and concludes at a terminal point 132. In other embodiments, the midsection 130 and back end 132, 136 could be configured in combinations of widths, including but not limited to an absence of the constricted midsection 130 and the absence of a two-fan tail-like back end 132, 136.

Figure 2A:
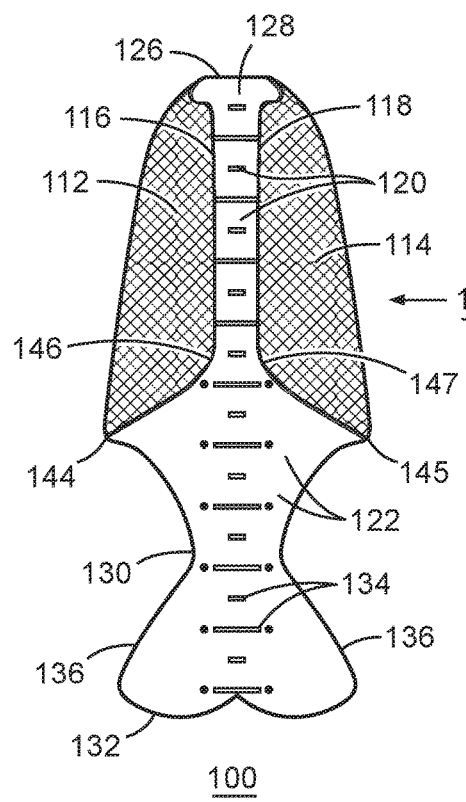
FIG. 2A is a top, perspective view of the fishhook remover aid showing a portion of the inside surface of the base and a top of a cover. A top of the cover shows an outside surface of the cover.

The front end 126 of the cover 170 has an opening 128. As shown in FIG. 2A, and in the preferred embodiment, the opening 128 is situated at the midpoint of the front end 126 and traverses a distance of the cover 170, terminating at the back end of the cover 146, 147.

Referring to FIG. 2A, a top view of the device is shown. The device shows a cover 170 and a portion of the inside surface 122 of the base 102. The cover 170 of the device 100 is distinguished from the base 102 as indicated by the shaded areas. The choice of the diamond pattern in the various figures indicates that the surfaces covered in the diamond pattern in the embodiments shown herein are black. Thus, and as an example, as seen in FIG. 2A, the black cover 170 overlays the front end 126 of the base 102. The cover 170 has a front end 126 and two back ends 144, 145. The two back ends 144, 145 of the cover 170 correspond to the two widest points on the cover 170 and also correspond to the two back ends 144, 145 of the base 102. The cover 170 in FIG. 2A shows a right top area 114 and a left top area 112.

Figure 2B:
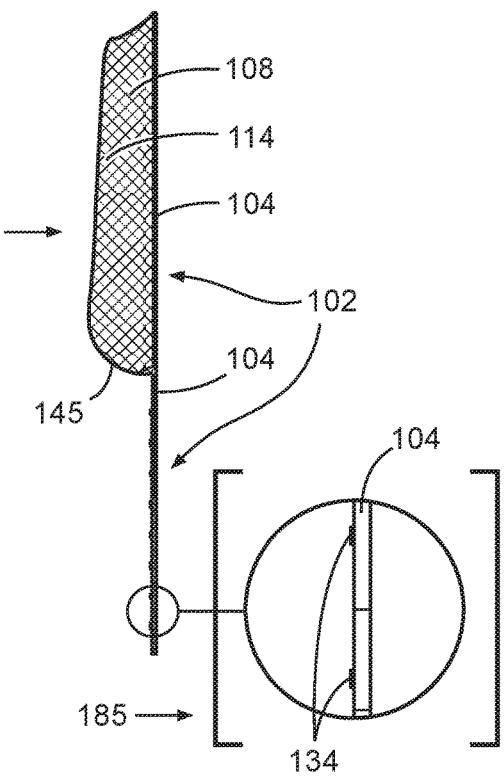
FIG. 2B is a side, perspective view of the fishhook remover aid with an expanded view of raised tabs associated with a ruler located on the inside surface of the base of the fishhook remover aid.
Figure 2C:
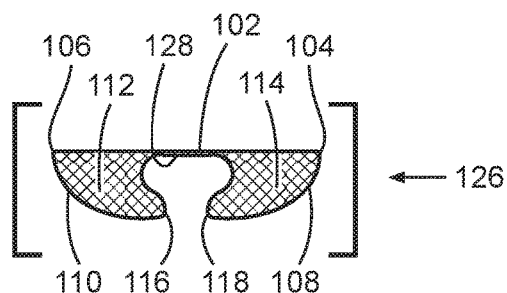
FIG. 2C is an expanded view of the fishhook remover aid lying on the top of the cover, showing an opening at a front end of the cover.
Figure 3C:
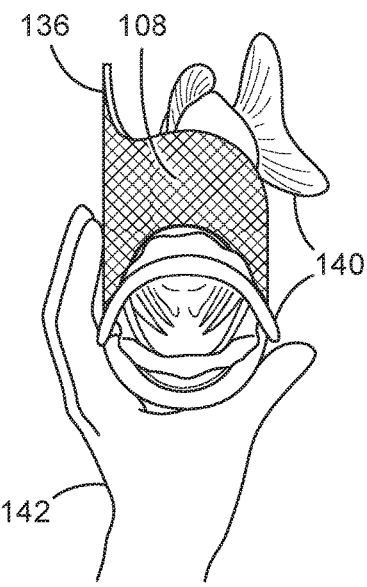
FIG. 3C is a side, perspective view showing a handler holding the device while the fish rests securely within the fishhook remover aid.

Referring to FIG. 2A and FIG. 2B, the right top area 114 of the cover 170 has a right edge 108. The right edge 108 of the cover 170 connects the right top area 114 of the cover 170 to the right edge 104 of the base 102. Correspondingly, the left top area 112 of the cover 170 has a left edge 110. The left edge 110 of the cover 170 connects the left top area 112 of the cover 170 to the left edge 106 of the base 102. In the present embodiment, the right top area 114 of the cover 170, the right edge 108 of the cover 170 and the right edge 104 of the base 102 are configured to form a concave curve. Similarly, the left top area 116 of the cover 170, the left edge 110 of the cover 170 and the left edge 106 of the base 102 are configured as a concave curve. Illustrative of the concave configuration, and referring to FIG. 2C, the outside surfaces 124 of the cover 170 are seen curving from the edges 104, 106 of the base 102 and towards the opening 128 at the front end 126 of the device 100. FIG. 3C also illustrates the concave configuration at the right edge 108 of the cover 170.

As seen in FIG. 2A, the cover 170 has an opening 128. In the preferred embodiment shown herein, the opening 128 is situated at the midpoint of the front end 126. The right top area 114 of the cover 170 and the left top area 112 of the cover 170 are separated by a space 120 that originates in the opening 128 at the midpoint of the front end 126. The space 120 runs from the opening 128 in the front end 126 of the cover 170 and terminates at distances 146, 147 prior to the back ends 144, 145 of the cover 170.

There are two inside edges of the cover 170 as shown in FIG. 2A. A right inside edge 118 corresponds to the right top area 114 and a left inside edge 116 corresponds to the left top area 112 of the cover 170. The inside edges 116, 118 define the width of the space 120 that traverses the length of the cover 170. The opening 120 between the inside edges 116, 118 exposes the inside surface 122 of the front end 126 of the base 102. In the cover 170 shown in the embodiment in FIG. 2A, the edges at the front end 126, the edges at the terminal ends 146, 147 of the space 120, and the edges at the back ends 144, 145 of the cover 170 are contoured. The contoured, soft edges prevent the fishing line from becoming snagged at points or connections joined together to form sharp edges.

Referring to FIGS. 1B and 2A, in one embodiment the inside surface 122 of the base 102 and cover 170 is made of a Low Density Polyethylene material. The Low Density Polyethylene material is selected to maintain the device's shape and provide strength to support a choice for a softer more pliable coating along the outside surface 124. Other embodiments may be prepared using Medium Density Polyethylene, High Density Polyethylene, Nylon, PC, ABS, or a variety of composite materials. In the present embodiments, the outside surface 124 is coated with Dura Grip® 6000 rubber. Alternatively, silicon based materials or coatings could be used. The benefit to using the combination of Low Density Polyethylene on the inside surface 122 together with the Dura Grip® 6000 rubber on the outside surface 124 is to allow the angler a sturdy yet flexible product in order to apply sufficient pressure on a caught fish positioned within the device 100 without damaging the fish.

In one embodiment, the inside surface 122 of the base 102 and the cover 170 includes hatching to enhance a firm grip on the fish. Diamond pattern hatching is one option. Other options include cross diagonal hatching, honeycomb hatching and dot hatching, but this list does not rule out the use of other hatching patterns not named herein. In the preferred embodiment, hatching is used on the outside surface 124 of the base 102 and the cover 170. Hatching on the outside surface 124 of the cover 170 ensures the angler can grasp the device 100 securely. Hatching on the outside surface 124 of the base 102 prevents the device 100 from slipping on surfaces including boat docks, rocks or moving boats. Diamond pattern hatching is one option. Other options include cross diagonal hatching, honeycomb hatching and dot hatching, but this list does not rule out the use of other hatching patterns not named herein.

As shown in FIG. 2A, the midsection 130 of the base 102 originates at points along the back ends 144, 145 of the base 102 and, in the preferred embodiment, the midsection 130 is configured to taper inwardly. In other embodiments the midsection 130 may remain the same width as the front end, or may taper inwardly at various widths. In the preferred embodiment, the back end 136 of the base 102 as shown in FIG. 2A originates at the narrowest portion of the midsection 130 and is configured into a fish tail 132. In other embodiments the back end 132, 136 may remain the same width as the front end, or may taper inwardly at various widths.

Referring to FIG. 1B, tabs 134 are positioned at equidistant intervals along the inside surface 122 of the base 102 to create a built-in ruler 134. The ruler 134 is used to determine whether the fish 140 is large enough to keep or whether the fish 140 must returned to the water after the fishhook is removed, or simply to know how long the fish is. In one embodiment, the ruler 134, in inches, in FIG. 2B shows raised tabs located along the front end 126, the midsection 130, and the back end 136 of the base 102 in half-inch increments. The expanded view in FIG. 2B illustrates that the tabs are raised. In the preferred embodiment, the height of each tab is approximately 0.01 inches, the width of each tab at the inch mark is approximately 0.75 inches and each tab is approximately 0.06 inches thick. The tabs at the half-inch marks are approximately 0.25 inches wide, approximately 0.01 inches in height and approximately 0.06 inches thick. In another embodiment, the ruler 134 may be presented using metric equivalents. In yet another embodiment, the ruler 134 may not be included on the base 102. The ruler 134 could be made with the inch or metric demarcations being recessed, raised to other heights, to other widths and to other thicknesses. Another embodiment could be prepared by stamping the demarcations directly onto the base 102.

In the preferred embodiment, an injection mold process is used to make the base 102 and cover 170. Although the various edges, lines and surfaces of the fishhook remover aid 100 are identified herein, the device itself is made as one contiguous piece. In the current injection mold process, there is a male (core) and female (cavity) piece to the mold. The device can be made using either a single shot injection molding process or a dual shot injection mold process. In the single shot injection shot process there are two molds: one for the Low Density Polyethylene (or any material chosen for the inside surface 122) and one for the Dura Grip® 6000 (or any material chosen for the outside surface 124). The Low Density Polyethylene is made initially in the first mold and the second mold is used to coat the Low Density Polyethylene with the Dura Grip® 6000. The dual shot process requires only one mold. The inner layer is poured first, a sleeve within the dual shot machine retracts and the outer layer is added. The Dura Grip® 6000 identified for used in the preferred embodiment is Dura Grip® 6000 Shore A30. Dura Grip® brand melt-processible rubber is available from Advanced Polymer Alloys, a division of Ferro Corporation, located in Wilmington, Del.

The preferred embodiment employs Low Density Polyethylene for the inside surface 122 of the base 102 and the inside surface 122 of the cover 170. Low Density Polyethylene provides support and structure but is still pliable enough to safely secure the fish when the fish is placed inside the cover 170. Dura Grip® 6000 is a soft, spongy, yet sturdy material selected to coat the outside surface 124. Thus, the Dura Grip 6000® becomes the outside surface 124 both for the base 102 and the cover 170. The Dura Grip® 6000 is poured to an approximate uniform thickness of 0.03 inches. The hatching on the preferred embodiment appears on the outside surfaces 124 of the cover 170 and the base 102. The hatched areas are lightly knurled, approximately 0.005 inches deep. In other embodiments, the hatching may be eliminated entirely or may be added to the inside surfaces 122 of the cover 170 and base 102 in addition to the hatching on the outside surfaces 124. Alternatively, only the inside surfaces 122 could contain hatching.

In the preferred embodiment, the length of the cover 170 is approximately 6.2 inches and the length of the base 102 from the front end 126 to the terminal point of the back end 132 is approximately 10.4 inches. The distance between the widest points on the back end 144, 145 of the cover 170 is approximately 4.3 inches. The approximate height from the bottom edges 104, 106 of the base 102 to the right and left inside edges 116, 118 of the cover 170 is approximately 0.8 inches at the front end 126 of the cover 170 and approximately 1.0 inch at the back ends 144, 145 of the cover 170. In the preferred embodiment, the ruler 134 shows tabs at half-inch intervals. When using the Low Density Polyethylene for coating the inside surface 122 of the device and the Dura Grip® 6000 Shore A30 for coating the outside surface 124 of the device 100, the weight of the device is approximately two ounces.

USES AND BENEFITS OF THE INVENTION

Figure 3A:
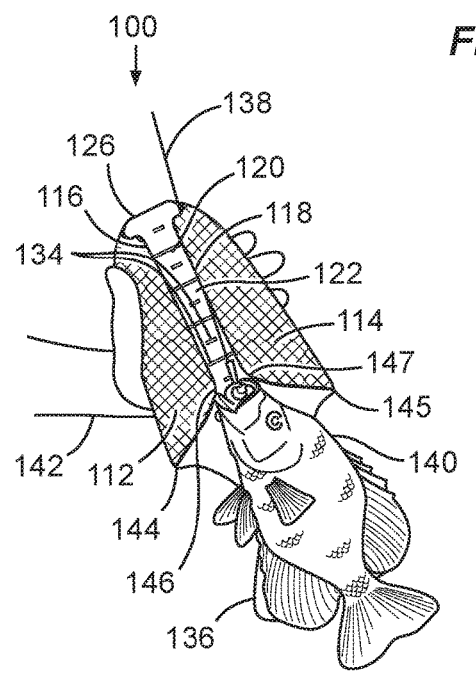
FIG. 3A is a top, perspective view showing angler inserting fishing line through a space located on the cover and showing a fish positioned on a midsection of the base and on a back end of the base of the fishhook remover aid.
Figure 3B:
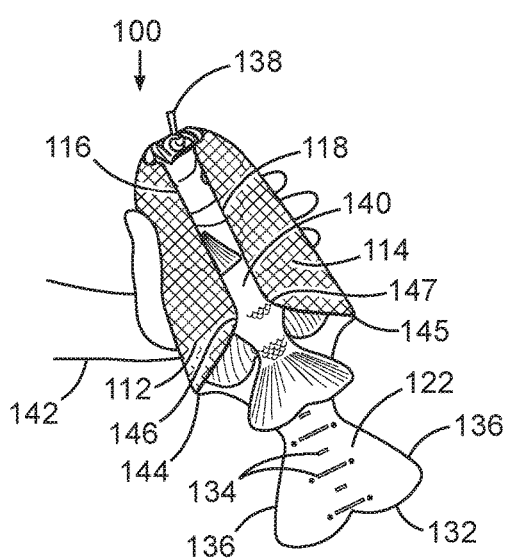
FIG. 3B is a top, perspective view of a fish securely resting between the front end of the base and the cover showing the ruler located along the midsection of the base and the back end of the base of the fishhook remover aid.

The current preferred embodiment meets a need when fishing for fish approximately less than twelve inches in length, including crappies, perch, and blue gills. Referring to FIG. 3A, when the caught fish is reeled in, it is easily inserted into the device 100. While the fish is suspended on the fishing line 138, the device is threaded around the line 138, and can easily be slipped down over the mouth of the fish. By continuing to direct the device down over the body of the fish, the fish is easily secured between the inside surfaces 122 of the base 102 and the cover 170. Again, as seen in FIG. 2A, FIG. 3B and FIG. 3C, the mouth of the fish is secured in the opening 128 at the front end 126 of the device 100. As seen in FIG. 3C, the fish is indisposed simply by placing one hand around the cover 170 and base 102 along the front end 126 of the device. The midsection 130 and back end 136, 132 of the base 102 offer additional support for the fish when it is secured between the front end 126 of the base 102 and the cover 170. Thus, the fish is further restrained from flopping back and forth because the fish is also restrained against the surfaces of the midsection 130 and the back end 136, 132. The length of the caught fish is readily measured using the ruler 134 shown in FIG. 3B during the time it takes to remove the hook 138.

The size of the fishhook remover aid 100 can be increased to receive fish of larger sizes. The ability to enlarge the fishhook remover aid 100 as shown here is important because some species of larger fish have toxic chemicals in their outer coatings and other species of fish have sharp scales or stingers that create problems when trying to remove fishhooks. Unfortunately, many anglers choose not to attempt to remove the fishhooks and simply resort to cutting the fishing line at some distance from the mouth and thereafter release the fish back to the water with the fishhook still lodged within the mouth of the fish. This option injures and possibly kills the fish and results in lost fishing tackle. Having the ability to dispose a fish within the fishhook remover aid and to immobilize the fish to remove the hook will help the ecosystem and save money on lost tackle and equipment as well. In addition, women and young children may be more interested in taking up fishing if they understood they would not be required to actually touch the fish they catch.

Because the outside surface of the device is coated with Dura Grip® 6000, the outside surface is resilient and thus resistant to scratches and tears. When Dura Grip® overlays Low Density Polyethylene the resultant layers prevent a sharp point of the hook from piercing through the materials, thus avoiding skin punctures. The resilient outside surface can easily be rinsed off, dried, and reused over and over again. The Low Density Polyethylene that coats the inside surface is also resilient and withstands scratches, tearing and tolerates repeated uses when rinsed or washed and dried over time. The device can be stored in a standard tackle box for easy transport to and from fishing outings. The flexibility of both the Low Density Polyethylene and Dura Grip® allows for the cover 170 to expand around a body of a fish of various thicknesses.

What is claimed is:

1. A fishhook removing aid comprising:
   a base, the base having a base length and a base width, a front end, a midsection and a back end, the base further comprising a top side, a bottom side, a first edge and a second edge, wherein the first edge and the second edge are configured as opposing edges;
   a cover attached to the base and having a cover length and a cover width, the cover further comprising a front end, a back end, a top side, a bottom side, a first outside edge and a second outside edge, wherein the first outside edge and the second outside edge are configured as opposing edges, the cover further comprising a first inside edge and a second inside edge wherein the first inside edge of the cover and the second inside edge of the cover are configured as opposing edges and are contoured to prevent a fishing line from snagging, wherein the back end of the cover corresponds to an origin of the midsection of the base, wherein the midsection of the base is constricted with respect to the cover and the back end of the base;
   a space defined between the first inside edge of the cover and the second inside edge of the cover, the space originating at an opening at a terminal location on the front end of the cover and extending along the length of the cover, wherein the space is configured to receive the fishing line;
   an inside surface of the fishhook removing aid comprising the bottom side of the cover and the top side of the base, the inside surface formed of a Low Density Polyethylene material, wherein;
   an outside surface of the fishhook removing aid comprising the top surface of the cover and the bottom side of the base, the outside surface configured to accept a second coating coated with Dura Grip® 6000, wherein the Dura Grip® 6000 is applied onto the top surface of the cover and onto the bottom side of the base; and
   a measuring apparatus assigned to the front end, the midsection and the back end of the base, wherein the measuring apparatus is a ruler running along the length of the base.

2. The device in claim 1, wherein the first opposing outside edge of the cover and the second opposing outside edge of the cover are curved edges, the first and second opposing outside edges extending from the front end of the cover to the back end of the cover.

3. The device in claim 1, wherein the inside surface is configured with a hatching pattern.

4. The device in claim 1, wherein the outside surface is configured with a hatching pattern.

5. The device in claim 1, wherein the cover length is less than the base length.

6. The device in claim 1, wherein the front end of the base corresponds to the front end of the cover.

7. A system for aiding in the removal of a fishhook from a fish comprising:
   a base, the base configured to support a weight of a fish and exert a pressure on a fish when an angler places the fish in contact with the base, the base having a front end, a midsection, a back end, a base length and a base width;
   a cover attached to the base, the cover configured to exert pressure on a fish when an angler places the fish in contact with the cover, the cover having a cover length, a cover width, a front end, and a back end, wherein the cover length is less than the base length, wherein the back end of the cover corresponds to an origin of the midsection of the base, wherein the midsection of the base is constricted with respect to the cover and the back end of the base;
   a space extending along the length of the cover, the space configured to receive a fishing line;
   an outside surface of the system, wherein the outside surface is coated with Dura Grip® 6000;
   an inside surface of the system, wherein the inside surface is formed from a Low Density Polyethylene material;
   an opening located at the front end of the cover, the opening configured to receive a mouth of the fish; and
   a ruler extending along the length of the base.

8. The system of claim 7, wherein the length of the base is approximately 10.5 inches, the cover width is approximately 40 percent of the base length, and a height from the base to a top portion of the inside surface of the cover is approximately 0.8 inches.

9. The system of claim 7, wherein the inside surface is configured with a honeycomb hatching pattern.

10. The system of claim 7, wherein the outside surface is configured with a honeycomb hatching pattern.

11. A device comprising:
    a cover, the cover having a front end and a terminal end, wherein the cover is attached to a base, the cover having a length and two opposing parallel edges;
    the base having a front end, a midsection, a back end and a base length, wherein the midsection is constricted with respect to the cover and the back end of the base and the back end of the base widens from the midsection to form a tail with two fan-like structures;
    a space located between the two opposing parallel edges of the cover, and extending along the length of the cover;
    an inside surface of the device, wherein the inside surface is formed from a Low Density Polyethylene material;
    an outside surface of the device, wherein the outside surface is coated with Dura Grip® 6000;
    an opening located at a midpoint of the front end of the cover; and
    a ruler extending along the length of the base.

* * * * *